United States Patent [19]
McClelland

[11] 3,878,531
[45] Apr. 15, 1975

[54] REMOTE MONITORING ATTACHMENT FOR A CASH REGISTER

[76] Inventor: Chester S. McClelland, 1808 Keokee St., Adelphi, Md. 20783

[22] Filed: Mar. 19, 1974

[21] Appl. No.: 452,548

[52] U.S. Cl. .......................... 340/366 R; 340/378 R
[51] Int. Cl. .............................................. G08b 5/36
[58] Field of Search .......... 235/61.11 E; 340/378 R, 340/366, 334, 336, 337, 366 R; 250/566, 571

[56] References Cited
UNITED STATES PATENTS
| | | | |
|---|---|---|---|
| 3,281,819 | 10/1966 | Muller | 340/378 X |
| 3,792,236 | 2/1974 | Dobras | 235/61.11 E |

*Primary Examiner*—Harold I. Pitts
*Attorney, Agent, or Firm*—Walter S. Pawl

[57] ABSTRACT

The monitoring device includes a shadow box having a face on which the amount of cash sales rung up on the cash register is conspicuosly reproduced in a suitably remote location above and back of the normally obstructed cash register, in fulll view of all the customers in the establishment where the cash register is being used. The means for reproducing the digits of the cash amount onto the face of the shadow box comprises a code strip mounted adjacent each digit numeral shown in the cash register corresponding to the numerical value represented thereby, a set of photocells being mounted in front of each of the code strips for sensing the numeric codes on the corresponding code strips,, and wiring connections from these photocells extending to decoder circuits in the remote shadow box for reproducing the numerals in the corresponding digit positions on the face of the shadow box.

5 Claims, 6 Drawing Figures

PATENTED APR 15 1975 3,878,531

3,878,531

REMOTE MONITORING ATTACHMENT FOR A CASH REGISTER

BACKGROUND OF THE INVENTION

Many business establishments using the customery cash register are subject to their elicit use by employees registering a lesser amount than the sale and pocketing the difference, unless, by chance, their attention is called to the improper amount registered, in which infrequent event, they may correct or make some excuse for the incorrect amount registered.

It was found possible to deter this practice of stealing a part of the business income by employees, by using some means for reproducing the cash amount showing on the cash register, in a more conspicuous position for unobstructed view, to be clearly seen by customers in any part of the establishment, such as a bar room, retaurant or other business, so that those who are interested as well as the payer of the bill, can observe and check on what amount is being registered. The employee's proper handling of his sales is thus made subject to the scrutiny of all customers at all times. Under these circumstances, the employees are not likely to make mistakes either purposely or unintentionally, and the owner sustains no loss of profits.

No cash register monitors of any type were found in the prior art.

SUMMARY OF THE INVENTION

The object of this invention is to expose the cash amount rung up on a cash register, into full view of all the customers in a bar room or other business establishment where the register is used.

A further object is to make an attachment for transmitting the cash amount registered on any cash register remotely to a shadow box that may be prominently exposed to show the cash amount in full view from any part of the room where the cash register is used.

A further object is to use code strips mounted adjacently to each numeral in the cash register and a set of photocells mounted in front of the strip on each digit of the cash amount registered, so as to sense the corresponding code strips, and wiring connections extending from these photocells into the decoder circuits for reproducing the digits in a shadow box remotely mounted in a prominent position for full view from a wide angle in front of the cash register.

Other and more specific objects will become apparent in the following description of a preferred form of the invention, as illustrated in the accompanying drawing.

DESCRIPTION OF THE PREFERRED EMBODIMENT

Figure 1:
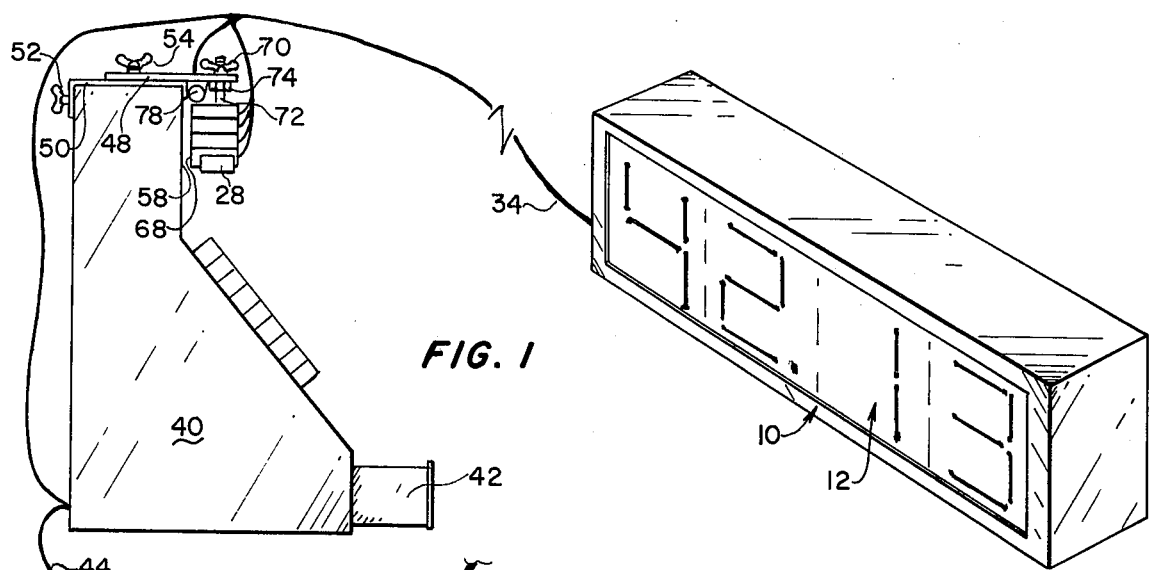
FIG. 1 is a perspective view of a shadow box connected to a typical cash register to which this invention may be applied.

The general view of a preferred form of this invention is shown in FIG. 1. The shadow box 10 has a face 12 with four numeral spaces in which the digits of the cash amount of 42.13 registered on the cash register are reproduced by corresponding decoder circuits which are controlled by the code sensing sets of photocells 23 for the several digits, the wiring diagram of one such circuit being shown in FIG. 4.

The wiring diagram includes a decoder 14 of known printed circuit type, with a power supply to which the other decoder circuits may also be connected in parallel into the lead lines 16 and 18 into which a high frequency current is supplied, as generated by the resistor 20 at the end of line 16 and connected to one of the lead lines from the d-c supply source, in combination with resistor 22 and capacitor 24 which are connected in parallel between the lead line 18 and lead line 16 at the inner end of the resistor 20, and capacitor 26 being connected between the line 18 and the lead 36 of the d-c supply, as shown. The resistors 20 and 22 each have a resistance of 50 ohms, and the capacitors have a capacity of 1,000 mfd.

The numeral reproducing face of each decoder circuit 14 is arranged in its corresponding digit space on the face 12 of the shadow box 10.

Figure 4:
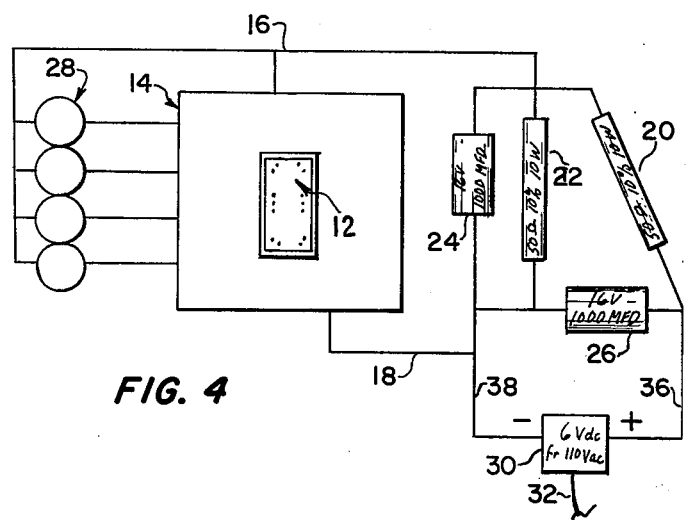
FIG. 4 is a wiring diagram of one set of photocells connected into a decoder circuit which is mounted in the shadow box for reproducing the digit number in the corresponding digit space on the face of the shadow box.

The wiring between the photocells and the decoder circuits in the shadow box may be passed through a cable 34 which may also include the a-c power supply cable 32 which branches out at the photocells for extension directly to a wall socket, or splicing into the supply cable for the cash register. In the shadow box cable 32 is connected to a transformer 30 to provide a 6-volt d-c supply through lead lines 36 and 38 to the outer end of resistor 20 and to the lead line 18 respectively, as shown in FIG. 4. Obviously, the d-c supply could be provided by batteries or drycells in the shadow box.

FIG. 1 further shows the outline of a typical cash register 40 with the drawer partially opened and an electrical cable 44 with a plug 46 for connection into a standard wall socket.

Figure 2:
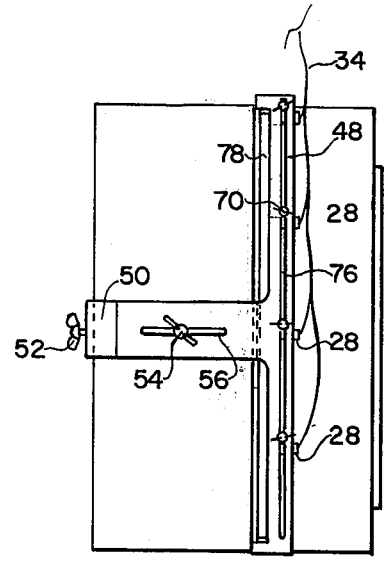
FIG. 2 is a plan view of the cash register and photocell adjustably mounted thereon for holding said photocells in alignment with the corresponding digit code strips.
Figures 5, 6:
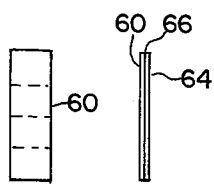
FIGS. 5 and 6 are front and side views respectively, of a digit code strip.

The sets of photocells 28 are adjustably mounted in a bracket 48 which is adjustably mounted on a bracket 50 which is clamped by thumb screw 52 to the top of the registeras may be seen in the plan view in FIG. 2. A thumb screw 54 passing through a slot 56 in bracket 48 is used to clamp the bracket 48 to the bracket 50 in an adjusted position to provide a suitably close spacing of the openings of all the photocell tubes 68 to the code strips 60 on the corresponding numeral plates 62 shown in the face 58 of the cash register.

Individual adjustment of each photocell set 28 is made by loosening the wing nut 70 on the bolt 72 which is fixed to the photocell 28, and moving it laterally and/or angularly in the slot 76 to properly align the photocell in front of the corresponding code strip 60 before retightening the wing nut 70 over the clamp nut 74 on the bolt below the slot 74. This clamp nut may be turned up or down on the bolt for vertical adjustment of the photocell set, before reclamping the wing nut 70.

A neon light tube 78 may be mounted on bracket 48 to provide more lighting for the code strips if necessary for better sensitivity of the photocells to the light and dark areas of the code strips.

Figure 3:
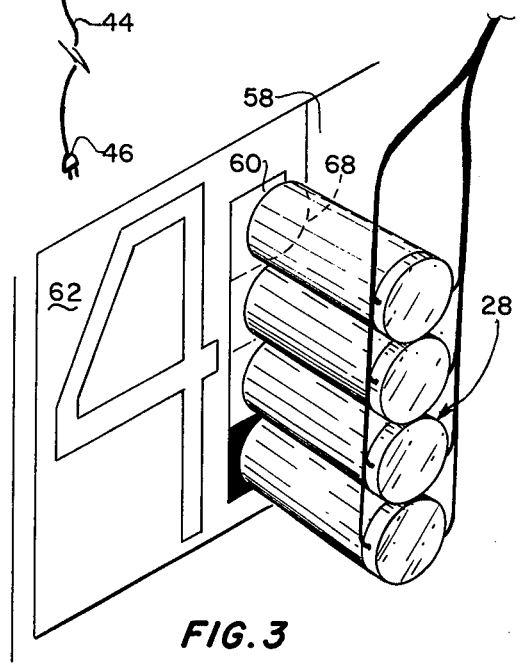
FIG. 3 is an enlarged perspective view showing the alignment of one set of photocells in exaggerated dimensions with relation to the size of the numeral shown.

FIG. 3 shows an exaggerated enlargement of one photocell set 28 to more clearly show the close adjustment required between the openings of the photocell shielding tubes and the corresponding code strip light and dark areas to prevent the spurious effect of outside extraneous light sources on the photocells. The size of the code strips and photocell sets is actually much smaller, so as to reduce the obstruction of the numeral portions of the cash amount displayed in the cash register.

The code strips may be rectangular pieces of white sheet material 60 having fouur substantially square spaces one or more of which may be selectively darkened or blacked out in any order in accordance with some numeral code to represent the ten numerals from 0 to 9 as follows:

| Numeral Represented | Blacked Out Space or Spaces on Code Strip |
|---|---|
| 0 | None |
| 1 | Top |
| 2 | Second |
| 3 | Third |
| 4 | Fourth |
| 5 | Top and Second |
| 6 | Top and Third |
| 7 | Top and Fourth |
| 8 | Top, Second and Third |
| 9 | All Four |

The strips 60 have an adhesive coating 66 on the back for application of the strips in the same relative position on each numeral plate 62 used in the cash register. This coating has a protective backing sheet 64 which is removed before the code strip is applied to the numeral plate.

Although there is only one specific form of the invention illustrated in the drawing, there are obviously many other ways of reducing it to actual practice, as by using other codes and other specific forms of the means for transmitting the image of the cash amount registered to the face of the shadow box; e.g., optical projection means for reproduction of the face of the cash register showing the cash amount projected on a screen in the face of the shadow box; or a simple periscope type attachment could be used incorporating a lens system to project the cash amount registered to an elevated shadow box.

Many other obvious modifications in the form and structure of the details of the several parts of this novel combination may be made without departing from the spirit and scope of the present invention.

What is claimed is:

1. A remote cash indicator for conspicuously displaying the sales amount indicated on a normally obstructed cash register, comprising
    a shadow box having a large face for easy viewing from any part of a business area in front of the cash register, and
    means for transmitting the images of the digits of a cash amount shown on the cash register to the face of said shadow box in the same order as they appear on the cash register.

2. A remote cash indicator as defined in claim 1,
    said transmitting means comprising a code strip mounted on each numeral plate in the cash register,
    a set of sensing photocells mounted in front of the code strip on each digit numeral plate of the cash amount registered,
    a decoder circuit in said shadow box for each set of photocells to reproduce the corresponding digits in the cash amount duplicated on the face thereof,
    cable connections extending between the photocell sets and the corresponding decoder circuits in the shadow box, and
    power supply means for said circuits.

3. A remote cash indicator as defined in claim 2, including
    a bracket adjustably mounted on said cash register and having means for supporting said photocell sets by individually adjustable means for alignment of each photocell set with the corresponding code strip.

4. A remote cash indicator as defined in claim 3,
    said power supply means comprising batteries mounted in said shadow box.

5. A remote cash indicator as defined in claim 3,
    said power supply means comprising a transformer mounted in said shadow box and powered by a-c current through a standard wall socket connection.

* * * * *